Sept. 30, 1930.  P. ERMERT  1,777,259
JOURNAL BEARING
Filed Sept. 20, 1928
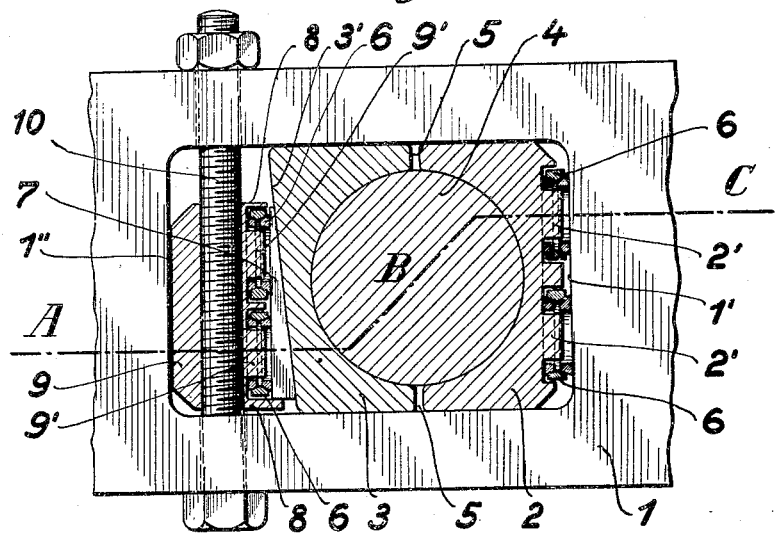
Fig. 1.
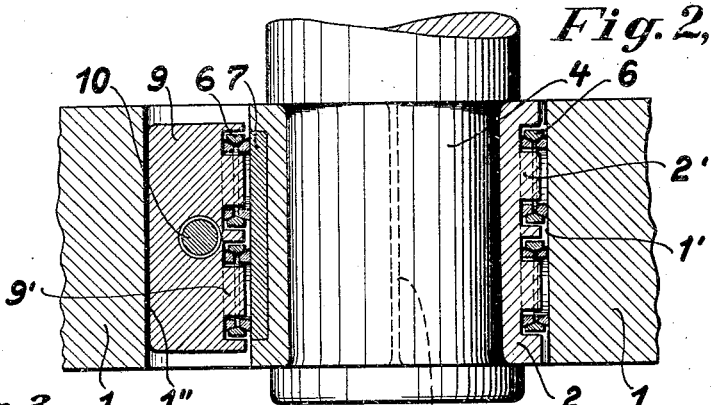
Fig. 2, A-C.
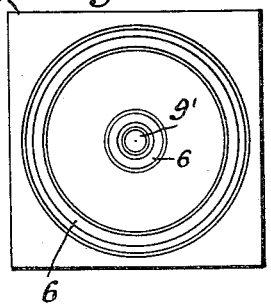
Fig. 3.
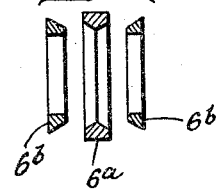
Fig. 4.
INVENTOR.
Paul Ermert
BY
ATTORNEY.

Patented Sept. 30, 1930

1,777,259

UNITED STATES PATENT OFFICE

PAUL ERMERT, OF ELBERFELD, GERMANY, ASSIGNOR TO RINGFEDER G. M. B. H., OF UERDINGEN-ON-THE-RHINE, GERMANY, A JOINT-STOCK COMPANY OF GERMANY

JOURNAL BEARING

Application filed September 20, 1928, Serial No. 307,186, and in Germany December 22, 1926.

This invention has reference to a novel construction of bearings or journals for pivots, trunnions, shafts and the like which are exposed to alterations and changes of pressure which are rapidly occurring in succession and mostly in opposite directions, such as for instance in the case of the bearings for the crank pins and the cross head rods and studs of steam engines, internal combustion engines, working machinery and the like, and it is intended among other important objects to provide means of reducing the excessive wear occurring in connection with devices of this kind and to compensate the inequalities of pressure and of wear in the operation of these and similar devices, and in further pursuance of this invention it provides means of adjusting the strain and the wear on the operating parts and on the bearings cooperating therewith. In the case of crank pins and the like as hereinbefore referred to there is the serious difficulty that the bearings and journals, even if made of a superior grade of material will wear out after a very short time only, and the empty space thereby produced between the pin, pivot or the like and the bearing becomes the cause of very heavy blows and slapping particularly upon the reversal of the direction of pressure of the pin or the like, which results in a very rapid destruction of the bearings. In order to obviate these difficulties it has been suggested to considerably reduce the specific pressure on the bearing or journal by resorting to excessive dimensioning of the pins and the like and respectively of the bearings and journals as a means of keeping the wear of such bearings and the like within admissible limits.

Now my invention has reference to a novel mode of construction of bearings and journals by means of which these difficulties are overcome substantially by the employment of spring-actuating intermediate members disposed between the bearings or journals and the supporting body part of the device, the cross head, head of a pitman-rod and the like, and which are so arranged and constructed as to become adapted to automatically force the bearings against the pins, studs, shafts or the like or inversely. It is a further object of this invention to provide means to reduce to a minimum the space through which the bearings will move against the spring-acting resistance with relation to the support-body of the bearing, the spring-action and the space allowed for movement being so adjusted as to approximately correspond to the admissible amount of wear of such journals or bearings. By this means it becomes possible to utilize the novel kind of bearing also in the case of systems of crank-rod drives in which it is of importance that the driven parts, pistons, steering and controlling slides, tools and the like will strictly adhere to the path prescribed for them.

The invention will be more particularly described by reference to the accompanying drawing showing an embodiment of the principles of the invention by way of exemplification as applied to a crank pin in Fig. 1 in sectional view at right angle to the pin; Fig. 2 is a section on the line A B C of Fig. 1; Fig. 3 is a face view of one of the bearing brasses; and Fig. 4 is a view of a ring spring group.

In the head 1 the sectional bearings 2 and 3 are arranged which, as appears from the drawings surround the crank pin 4. Preferably a slot 5 is provided between the two sections of the bearing in view of the wear on the bearing sections to be anticipated. Upon one side of the head 1 the bearing section 2 is mounted upon groups or sets of ring springs 6 of well-known construction of which a plurality may be adjacently disposed and which surround the projections or studs 2' of the bearing section with a certain amount of play and which rest against and are supported by the substantially smooth transverse wall 1' of the bearing head 1. In the present instance each group or set of ring springs is shown as comprising three rings having inclined or beveled engaging surfaces, to wit, a central tension ring 6ª and two oppositely disposed compression rings 6ᵇ. The bearing section 3 is provided with a bearing and supporting surface 3' at an inclination to the axis of the crank pin head 1 and against which a wedge 7 is adapted to bear the wedge-angle of which is of such size that its rear surface is at right angle to the axis of the crank-rod head 1. Upon its front ends the wedge 7 is clasped by the projections or lugs 8 of a slide 9 which bears against the surface 1″ of the crank-rod head 1 which is situated at right angle to the axis thereof and along which the slide 9 may be displaced in the well-known manner by means of the screw 10. The wedge 7 is supported by a plurality of adjacently disposed groups of ring springs 6 which seat in grooves 9ª in and bear against the slide 9 from which the corresponding studs or projections 9′ project with play into these annular springs. By the rotation of the screw 10 the slide 9 with the wedge 7 and the annular springs 6 inserted therebetween may be displaced by which means the springs 6 may be tensioned or relieved, so that by this means the space may be exactly regulated through which the pin 4 is adapted to move with relation to the crank-rod head at each change of stroke. By a correspondingly strong tensioning of the springs 6 by the action of the wedge 7 this space may be reduced to the desired minimum value. In the case of crank movements of power engines this space need not be any larger than the admissible distance of the bearing sections, when worn out, from the pin or stud of the ordinary crank-pin bearing. Instead of the wedge 7 any other correspondingly shaped adjusting and controlling means may be employed for the purpose of tensioning the springs.

The ring springs employed may be of types in common use and as exemplified, for instance, by Wikander Patent 1,598,228, of August 31, 1928, or Bell and Wikander Patent 1,689,662, of October 30, 1928, or of any of the other types of ring springs in general use.

I claim:—

1. In a journal bearing, a bearing head, a journal arranged therein, a two-part, vertically-divided sectional bearing in the bearing head and enclosing the journal, ring spring cushioning devices between one of the bearing members and a side of the head, a wedge engaging the other bearing member, an adjusting slide for the wedge arranged between the wedge and the opposite side wall of the head, and ring spring cushioning devices between opposed surfaces of the wedge and slide.

2. In a device of the kind described, a hollow journal-supporting body, a journal housed in said body, sectional bearings surrounding said journal, ring spring supporting and cushioning devices between one of said bearing-sections and a wall of said body, wedge-shaped adjusting member adjustably engaging the outside of the opposite bearing section, a slide intermediate the wedge-shaped adjusting means, a wall of the supporting body and marginally encompassing said adjusting means, ring springs on said slide and bearing against the wedge-shaped adjusting body, and means to move said slide in parallelism to said adjusting means.

3. In a device of the kind described in combination, a hollow journal-supporting body, a journal housed in said body, bearings surrounding said element, projections on said bearings, adjusting means for the bearings, and ring springs loosely surrounding said projections and retaining the bearing and adjusting means resiliently in their proper positions.

In testimony whereof I affix my signature.

PAUL ERMERT.